US006416867B1

(12) United States Patent
Karpen

(10) Patent No.: US 6,416,867 B1
(45) Date of Patent: Jul. 9, 2002

(54) REDUCED GLARE NEODYMIUM OXIDE CONTAINING WINDOW GLASS

(76) Inventor: Daniel Nathan Karpen, 3 Harbor Hill Dr., Huntington, NY (US) 11743

(*) Notice: Subject to any disclaimer, the term of this patent is extended or adjusted under 35 U.S.C. 154(b) by 0 days.

(21) Appl. No.: 09/688,601

(22) Filed: Oct. 16, 2000

(51) Int. Cl.$^7$ .............................................. B32B 17/06

(52) U.S. Cl. ........................ 428/426; 501/64; 501/903; 501/904

(58) Field of Search ........................... 428/426; 501/64, 501/904, 905

(56) References Cited

U.S. PATENT DOCUMENTS

| | | | |
|---|---|---|---|
| 3,714,055 A | 1/1973 | Matsuura | 252/300 |
| 4,315,186 A | 2/1982 | Hirano | 313/111 |
| 4,454,446 A | 6/1984 | Kobayashi | 313/480 |
| 4,521,524 A | 6/1985 | Yamashita | 501/64 |
| 4,769,347 A | 9/1988 | Cook | 501/64 |
| 5,076,674 A | 12/1991 | Lyman | 359/274 |
| 5,077,240 A | 12/1991 | Hayden | 501/67 |
| 5,548,491 A | 8/1996 | Karpen | 362/510 |
| 5,830,814 A | 11/1998 | Combes | 501/70 |
| 5,844,721 A | 12/1998 | Karpen | 359/603 |
| 5,958,811 A | 9/1999 | Sakaguchi | 501/71 |
| 5,961,208 A | 10/1999 | Karpen | 362/510 |

OTHER PUBLICATIONS

Lide, David R. edition; Handbook of Chemistry and Physics; 73$^{rd}$ edition; CRC Press; Ann Arbor, Michigan; 1992. p. 4–18, 4–77. no month.
Weeks, Mary Elvira; Discovery of the Elements, Journals of Chemical education; 6$^{th}$ Edition; 1960; p. 552. no month.
Moellen, Therald; The Chemistry of the Lanthanides; Reinold Publishing Company; New York; New York; 1963; pp. 1–4. No month.
Hutner, S.; "Optical Spectroscopy of Lathanides in Crystalline Matrix; in Systematics and the Properties of the Lanthandies"; edited by Shyama P. Sinha; 1983; p. 313. No month.
Weyl, Woldemar A., and Evelyn Chostner Marboe; The Constitution of Glasses, vol. 1; Interscience publishers, a division of John Wiley & Sons; New York, New York; 1962; p. 315. No month.
Bouma, P.J.; The Colour Reproduction of Incandescent Lamps and "Philiphane Glass"; Philips Technical Review; 1938; vol. 3; pp. 27–29 No month.
Weyl, Woldemar A.; Coloured Glasses; Dawson's of Pall Mall; London; 1959; No month.
Weidert, F.; "Das Absorptionspektrum von Didymglasern Bei verschiendenartiger Zusammensetzung des Grundglases"; Zeithschrift f. wiss. Photo.; 1921–22; vol. 21; pp. 254–264. No month.

(List continued on next page.)

Primary Examiner—Archene Turner
(74) Attorney, Agent, or Firm—Alfred M. Walker

(57) ABSTRACT

A reduced glare window glass, suitable for use in glass window, containing Neodymium Oxide, a rare earth compound. The Neodymium Oxide filters out the yellow light of the spectrum, thereby providing improved vision. Incorporation of yellow light in the light spectrum desaturates colors and reduces contrast. Improvement in contrast and a reduction in glare permits, for example, one to use this window glass in a building to reduce glare without the expense of blinds or curtains that are normally used to reduce glare. Additionally, the light transmittance is kept high, as high as 61.81 percent with a Neodymium Oxide doping of the glass in the amount of at least 0.0244 grams per square centimeter. This glass can be used for multiple layers of glass in assembled glazing.

8 Claims, 2 Drawing Sheets

OTHER PUBLICATIONS

Dannmeyer, F.; "Das Neophanglas als nautisches Hildsmittel bei unklarer sicht"; Die Glashutte; 1934; No. 4, pp. 49–50. (also translation in English) No month.

Rosenhauser, K and F. Weidert; "Ueber die spektrale Absorption von Neodymglasen"; Glastechnische berichte; 1938; vol. 16; No. 2; pp 51–57. No month.

Ctyroky, V.; "Uber mit Nd2O5 und V2O5 gefarbte Glasser"; Glastechnishe berichte; vol. 18; No. 1; pp. 1–7. No date.

REDUCED GLARE NEODYMIUM OXIDE CONTAINING WINDOW GLASS

FIELD OF THE INVENTION

The invention relates to the development of a new reduced glare window glass, and in particular a new window glass that will be capable of improving color rendition of viewed objects, and to eliminate much of the discomfort caused by the glare from the sun while at the same time maximizing light transmittance.

BACKGROUND AND THEORY OF THE INVENTION

It has long been recognized that the visual discomfort from glare from the sun coming through windows is a major problem that has not been properly solved up to this time.

Combes (U.S. Pat. No. 5,830,814, (1998)), discloses a glass composition suitable for the manufacture of glazings for use in the architectural field or for fitting in motor vehicles. These compositions contain the following constituents, expressed in weight percentages, defined by the following limits: $SiO_2$ 69 to 75%, $Al_2O_3$ 0 to 3%, CaO 2 to 10%, MgO 0 to 2%, $Na_2O$ 9 to 17%, $Fe_2O_3$ (total iron) 0.2 to 1.5%. These compositions can also contain fluorine, as well as oxides of zinc, zirconium, titanium and less than 4% barium oxide, the sum of the percentages of the alkaline earths remaining equal to or below 10%.

Sakaguchi et al. (U.S. Pat. No. 5,958,811, (1999)) discloses an ultraviolet and infrared radiation absorbing glass having excellent ultraviolet radiation absorbing power and a bronze or neutral gray tint which is suitably used as a window glass for vehicles of automobiles and also as a window glass for construction materials is provided. The glass comprises, in % by weight: basic glass components comprising 65 to 80% $SiO_2$, 0 to 5% $B_2O_3$, 0 to 5% $Al_2O_3$, 0 to 10% MgO, 5 to 15% CaO, 10 to 18% $Na_2O$, 0 to 5% $K_2O$, 5 to 15% MgO+CaO, and 10 to 20% $Na_2O+K_2O$, and coloring components comprising 0.20 to 0.50% total iron oxide (T-$Fe_2O_3$) in terms of $Fe_2O_3$, 0 to 3% $CeO_2$, 0.025 to 6.0% $La_2O_3$, 0 to 2.0% $TiO_2$, 0.0002 to 0.005% CoO, 0.0002 to 0.005% Se, 0 to 0.01% NiO, and 0 to 1.0% $SnO_2$, wherein 5 to 25% of said T-$Fe_2O_3$ in terms of $Fe_2O_3$ is FeO.

Hayden et al. (U.S. Pat. No. 4,470,922, (1991)) discloses a strengthenable, high Neodymium-containing glass containing 40 to 60% $SiO_2$ and 10 to 30% Neodymium Oxide, and various other inorganic compounds in minor amounts.

Kobayashi (U.S. Pat. No. 4,454,446, (1984)) discloses a cathode ray tube for a light source with a face plate being made of a glass material containing the rare earth oxides $Nd_2O_3$ and $Pr_2O_3$, so that satisfactory color light and contrast are obtained even under the sun light.

Matsuura (U.S. Pat. No. 3,714,055, (1973)) discloses glass color filters for use in color photography under white and warm white fluorescent lights prepared from a glass composition, containing various glass components one of which is Neodymium Oxide in the amount of 0.3 to 2.5 percent.

Yamashita (U.S. Pat. No. 4,521,524, (1985)), discloses contrast enhancement filters for color CRT display devices which have between 5 and 40% Neodymium Oxide as a component of the glass.

Cook et al. (U.S. Pat No. 4,769,347, (1988)) discloses contrast enhancement filter glass for color CRT displays which has between 10 and 25% Neodymium Oxide as a component of the glass.

Hirano et al. (U.S. Pat. No. 4,315,186, (1982)) discloses a reflective lamp with a Neodymium Oxide doped front lens section fused to a reflective mirror section. Hirano restricts the amount of Neodymium Oxide in the front lens section to a range of 0.5 to 5.0 percent by weight. At an amount of Neodymium Oxide above 5 percent, the difference in the thermal expansion coefficient between the resultant glass material and that constituting the reflective mirror becomes too great, so that it becomes difficult to fuse the front lens section to the reflective mirror base.

Lyman (U.S. Pat. No. 5,076,674, (1991)) discloses a reduced first surface reflectivity electrochemichromic rearview mirror assembly. In the art of Lyman, Neodymium Oxide is one of a number of possible materials of high refractive index in a triple layer thin film stack.

What the present invention does, and what the prior art fails to do, is to reduce the amount of yellow light transmitted through window glass, since reducing the amount of yellow light in the spectrum improves color rendition and reduces glare. The approach of the present invention to the problem of visual discomfort and visual disability is to add Neodymium Oxide, a rare earth oxide, to the window glass to absorb the yellow light and reduce its presence in the spectrum of the transmitted light. The Neodymium Oxide is added to the window glass in an amount greater than 0.0191 grams per square centimeter of glass surface to provide a total maximum transmittance of 72.57 percent. Below this amount, there is insufficient Neodymium Oxide to absorb sufficient yellow light to adequately reduce glare in a satisfactory manner. As window glass is made in various thicknesses, it is necessary to express the amount of Neodymium Oxide necessary to accomplish the goal of glare reduction as a weight per unit surface of glass, rather than as a weight percentage of the glass material.

This invention is important as an energy conservation technology. As glare is reduced by means of absorbing yellow light in the spectrum of the transmitted light, one no longer needs curtains or shades to block out unwanted sunlight, so the glass can be used as a glazing material on the sides of buildings to allow for the use of daylighting in place of interior artificial illumination. Furthermore, by the sides of windows, one can see well under as much as 700 to 7,000 foot-candles of direct sunlight without bothersome glare.

To explain the importance of the present invention, a discussion of its Neodymium Oxide component is as follows:

Neodymium is a rare earth element, having an atomic number of 60 and an atomic weight of 144.24. It combines with oxygen to form Neodymium Oxide, $Nd_2O_3$, having a molecular weight of 336.48.[1]

The elucidation of the rare earths in elemental form took the better part of the nineteenth century, and the properties of Neodymium that are important to the lighting art in this patent application were known even before Neodymium was prepared in metallic form. In 1803, Klaproth discovered the mineral ceria. It was also found about the s time by Berzelius and William Hisinger.[2] This mineral proved to be a mixture of various rare earth oxides. In 1814, Hisinger and Berzelius isolated Cerium Oxide from the ceria earth.[3] In 1839, Moslander found the rare earth lanthana in the ceria.[4] In 1841, Moslander treated lanthana with dilute nitric acid, and extracted from it a new rose colored oxide which he called didymium, because as he said, it seemed to be "an inseparable twin brother of lanthana".[5]

It was believed that didymium was a mixture of elements. The separation proved difficult. In 1882, Professor Bobuslav Brauner at the University of Prague examined some of his didymium fractions with the spectroscope and found a group of absorption bands in the blue region (λ=449–443 nanometers) and another in the yellow (λ=590–568 nanometers).[6] In 1885, Welsbach separated didymium into two earths, praseodymia and neodymia.[7] The neodymia has the aborption bands in the yellow region. The neodymia earth is Neodymium Oxide.

The spectra of rare earths became of great interest to a number of investigators. The most impressive feature about the spectra of rare earth ions in ionic crystals is the sharpness of many lines in their absorption and emission bands. As early as 1908, Becquerel realized that in many cases these lines can be as narrow as those commonly observed in the spectra of free atoms of free molecules.[8]

However, many solids that are of practical use today are amorphous or glassy rather than crystalline. That means that in the immediate vicinity of like ions in such substances is similar, but that there is no long range order in the sample. Rare earth ions can be easily incorporated into many glasses.

It was noted quite early that in glasses, as might be expected, the most prominent feature of the rare earth crystal spectra, the extreme sharpness of the optical lines, vanishes.

From a simplified point of view, a glass is a supercooled liquid. It can therefore be assumed that the spectra of rare earth ions in glasses will be similar to those of rare earth ions in liquids. The spectra in liquids show a "crystal field splitting", although with very wide lines. This is an indication that the rare earth ions in a liquid are surrounded by a near neighbor shell of ligands—similar to the configuration found in a solid and the same for every dissolved rare earth ion, and that the uncorrelated structure is only beyond the near neighbor shell. If the near neighbor coordination in a liquid is the same as in a solid, one can understand the similarity in the magnitude of the crystal field splitting and the solution. In glasses the rare earth oxides are incorporated as oxides. From the reasoning just cited one can expect that rare earth spectra in glasses to be similar to those of the stable oxide modification of the particular rare earth ion; this expectation is verified by experimental findings.[9]

The absorption of an ion may undergo a fundamental change when placed in different surroundings. A great variety of colors which can be obtained with divalent copper, cobalt, or nickel ions have been attributed to the differences in co-ordination numbers and the nature of the surrounding atomic groups. The change of an ionic bond into a covalent bond produces a completely different absorption spectra. The close interdependence of light absorption and chemical change is not surprising when it is realized that the electrons which are responsible for the visible absorption are also responsible for the chemical interactions and the formation of compounds.

The case, however, is different with the rare earth compounds. Their colors depend on the transitions taking place in an inner, well protected, electronic shell, whereas the chemical forces, as in other elements, are restricted to deformations and exchanges of electrons within the outer electronic shells. Consequently, the color of Neodymium compounds remains practically independent of the nature of the atoms in which the element is linked. The hydrated salts are amethyst colored, just as the water free salts, the ammoniates, the hyroxide, or the oxide. Chemical changes affect color only to a minor extent.[10]

A number of studies of Neodymium Oxide containing glasses have been conducted to examine the absorption spectra. Weidert conducted a systematic study in 1922. Samples of pure Neodymium Oxide were made available for the first time, relatively free of contamination from impurities such as praseodymium.[11] Spectra were published showing the absorption of yellow light in a broad band from 568 to 595 nanometers.[12]

According to Rosenhauer and Weidert, the absorption spectra of the $Nd^{+3}$ ion in glasses signals any change of the structure which affects the stability of the glassy state. Composition changes which increase the tendency of a glass to devitrify also blur the normally sharp absorption bands of the $Nd^{+3}$ ions. The absorption indicators can be used therefore for studying the compatibility of oxide systems.[13] In their studies, the base glasses differed in their alkalis. The smaller the atomic radius of the alkali the more diffuse is the absorption band. The fine structure of the rubidium glass gradually disappears when this large alkali is replaced by the smaller potassium, sodium, or lithium ion. The corresponding lithium glass could be obtained only by rapid cooling; otherwise crystal-lization took place. Thus, there seems to be a general connection between the tendency of a glass to devitrify and its absorption spectrum. In all the glasses which crystallize readily Neodymium causes only a somewhat diffuse absorption spectrum.[14] Regardless of the alkali base of the underlying glass, the absorption of yellow light between 568 and 590 nanometers is seen in all samples of glass (see FIG. 1).[15]

Glasses containing Neodymium Oxide experience "dichroism". In artificial light, the Neodymium Oxide glass appears as a brilliant red. The color sensation not only varies with the type of illumination, but also with the thickness of the glass layer. In thin layers or with low concentrations of Neodymium Oxide these glasses are blue, in thick layers or with high concentrations, red.[16]

V. Ctyroky made a study of the dichroism of glasses containing various combinations of Neodymium and Vanadium. It was his attempt to calculate the thickness of the glass and the concentration of the colorants which produce the maximum dichroism. The color play of these glasses is caused by the Neodymium Oxide, for the Vanadium Oxide produces a green color which serves only to modify the original blue-red dichroism of the rare earth. The absorption of the yellow light between 568 and 590 nanometers is so intense that even a faintly colored Neodymium Oxide glass absorbs yellow light almost completely. Thus the transmitted spectra is divided into two parts, a blue one and a red one. The color sensation which such a glass produces depends on the intensity distribution of the light source. In daylight the blue part predominates; in artificial light (incandescent), which is relatively poor in short-wave radiation, the red predominates.[17]

Theoretically, it was to be expected that a filter having a sharp absorption band in the red and green basic sensation curves would lead to an increase in the saturation of practically all colors with medium saturation. An optimum improvement is obtained by an absorption band at 573 nanometers which falls in the middle of the Neodymium Oxide absorption band in glass.[18]

The characteristic absorption of a Neodymium Oxide glass, especially its narrow intense band in the yellow part of the spectrum, affects color vision in a unique way. Looking through such a glass at a landscape or a garden in bloom, the red and green hues are strongly accentuated; especially do all colors containing red stand out very clearly.[19]

Another interesting feature when looking through a Neodymium Oxide containing glass is the distinction between the green of vegetation and a similar green hue produced by the blending of inorganic pigments. Whereas the hues of both greens may be the same, the reflection spectra are fundamentally different in respect of their intensity distribution; for the chlorophyll of plants possesses a spectrum rich in fine structure.[20]

Bouma explains how the electric light (incandescent lamp) can be improved by the introduction of a colored envelope using a glass containing Neodymium Oxide, known as "Neophane" glass (for the purposes of clarity, an envelope refers to the outer shell of the lamp bulb). It is clear that large portions of the spectrum must not be weakened to any extent. Otherwise, there would be too great a decrease in the efficiency. Only an improvement of the color which can be obtained with a relatively slight loss of light can be considered.[21]

The only possibility thus consists of the absorption of one or more relatively small regions of the spectrum. The pertinent question is what colors may be considered in this connection? In general, absorption of a given color is accompanied by the following two objections:

1. An object which reflects almost exclusively this color appears too dark.

2. Objects which exhibit the color under consideration in a less saturated form will appear still less saturated.

The first objection holds primarily for the colors at the extremities of the spectrum, thus for red and blue. Very saturated red, for example, can only occur when a material reflects practically exclusively red and orange. The same is true for blue.

For yellow, the situation is different. Highly saturated yellow occurs in nature as a rule, not only because a narrow region of the spectrum is reflected, but because red and green as well as yellow are fairly well reflected, and only blue and violet are absorbed to a large extent.

The second objection also holds particularly at the extremities of the spectrum; the blue, which is reproduced in electric light in a much less saturated form than in daylight, may certainly not be made still duller. The saturation of the red may also not be decreased too much, since otherwise the reproduction of skin color would be made worse.

For the reasons mentioned above, the second objection is also of much less importance in the case of yellow.

Bouma surrounded an incandescent lamp with a bulb of the Neodymium Oxide containing Neophane glass, and compared the color rendition to an incandescent lamp surrounded by an ordinary opal glass bulb. His results indicated the majority of the colors become more saturated, a change which is to be desired, especially at relatively low levels of illumination. In particular, the blue, which upon changing from daylight to incandescent has become considerably less saturated is again reproduced in a more saturated form.

The orange is shifted toward the red: the shift in the direction yellow to red is in general experienced as an increased "warmth" of that color.

The green, which upon translation from daylight to incandescent light had become a somewhat dubious yellow-green, goes back to green again under the influence of the Neophane glass.

Finally, Bouma notes that white and the very unsaturated colors are shifted in the direction of blue-violet. This may certainly not be considered an advantage since however the change is not very great, and moreover since it lies almost in the same direction as the shift on transition from daylight to incandescent light, the shift is not disturbing.[22]

In summary, Bouma found that the use of the Neodymium Oxide containing Neophane glass has the advantage of reproducing most colors in a more saturated form and of making the orange-yellow warmer. Various disadvantages of incandescent light, such as the faded appearance of blue and the shift of green towards yellow-green, are partially overcome. The most important advantage of the incandescent light such as the high saturation of the orange and of the colors in its neighborhood, the greater intensity of red, are retained.

Dannmeyer made an investigation of Neodymium Oxide containing Neophane glass as a vision aide in bad weather for navigational purposes.[23] If one looks at a spectrum through this glass, one will notice that yellow is eliminated, but red and green appear much clearer. If one looks at a landscape, even in murky weather, one will see wonderful lustrous colors, emphasizing everything red and even green. But there is another special effect: the discomforting blinding effect created primarily by yellow disappears at the same time. If one looks at the branches of a bare tree against a bright sky, one won't be able to see the ends. They disappear in the general glaze. If, however, one looks though the Neodymium Oxide glass—or as it is now technically called, Neophane glass—even the slightest differences are emphasized. All blinding effects against the clear sky or the sun, disappear and the elements of the optical picture appear more sharply even when looking toward the sunset and twilight pictures have more contrast.

As further noted by Dannmeyer, the effects of using the Neodymium Oxide containing Neophane glass was studied during the summer and fall on the Elbe River and in the North and Baltic Seas. It was shown that clear sighting made red and green as already mentioned, especially clear. External identification of a ship by the color of its smoke stack, bottom paint, ensign and other elements was made much easier. If the weather was hazy or misty, so that one could see the other ship only as a silhouette grey against grey, color differences could still be seen that could not have been recognized with unaided sight. But what was immensely important was that ships that in hazy weather seemed to be the same distance apart, were seen to be at varied distances from one another; both location and movement were much easier to differentiate.

It is well known that on the Elbe, at sunset, outgoing ships looking into the sunset have on occasion had optical difficulties caused by the blinding of the sun. Markers are difficult to distinguish, and even though ship pilots are exceedingly well informed, discerning an oncoming ship is sometimes exceedingly difficult.

According to Dannmeyer, Neodymium Oxide containing Neophane glass prevents all of these things from happening to the eye. Along the lower Elbe one is able to distinguish a lengthening of the coast line even in hazy weather, and thus seeing distances are actually extended by about a nautical mile. On the North Sea, it is possible to make out various vessels that would not have been discernible in the misty weather. The grey of the vessels appears darker than the surroundings through the eyeglasses. In the reflection of the sinking sun, in which the eye really could not distinguish objects, the vessels were clearly discernible through the Neodymium Oxide containing Neophane glass.

A physiological explanation of how the eye sees colors provides an explanation of the visual effectiveness of Neodymium Oxide containing window glass. The following explanation is provided by Gouras.[25]

There are three cone mechanisms in the human visual system, with peak sensitivities near 440 nanometers in the blue-violet, 540 nanometers in the green, and 610 nanometers in the orange. These mechanisms are loosely called "blue", "green" and "red" processes in vision because they may be roughly thought of as being affected, respectively, by blue, green, and red light.

There are approximately 6 to 7 million green plus red cones per eye, and less than 1 million blue cones. The green and red cones contribute towards seeing fine detail and contrasts; the blue ones do not. The blue cones are thought to provide, mainly, the means of distinguishing between yellow and white appearing objects; the blue-cone mechanism is excited by blue light and inhibited by yellow light.

When mid-spectral (yellowish) images are in sharp focus on the retina, bluish wavelengths are out of focus. Low visual acuity is associated with the blue-cone mechanism, and high visual acuity with the green plus red cone mechanism. The term "yellowish images" does not necessarily imply any yellow content in the light, since green plus red yields the sensation of yellow.

The cones feed their signals into various kinds of cells in and beyond the retina. Strongly cone opponent cells are those that are excited by one color of light and inhibited by another. The "red-green contrast detectors" contribute heavily to both luminance and color contrast, and also to the detection of differences between elements of a scene. They supply information on fine spatial detail.

The strongly cone-opponent cells (associated with the green and red cones) are turned off or on by green or red light, and are very unresponsive to yellow light. The red-green contrast detector is totally inhibited by yellow light.[26]

Thus, Neodymium Oxide containing window glass appears to provide the maximal filtering effect of the discomforting yellow light in order to improve contrast, visual acuity and color recognition.

Two recent studies of the functioning of the eye for people of low vision are of interest. Neodymium Oxide containing window glass will be of help not only to people who have normal vision, but also to people who are visually impaired.

Faye reports that the visual impression in viewing colored objects is a vivid "true" color similar to the view in full sunlight.[27] In viewing high contrast acuity charts, contrast sensitivity chart tests (Vistech VCTS 6500), and reading material, there is an increased contrast between black and white, when incandescent light bulbs containing Neodymium Oxide are used indoors. White appears whiter and black appears darker because of the decreased yellow emission of the Neodymium Oxide containing bulb.

To date, while no specific recommendations can be made, it appears that a history from visually impaired patients that they need sunlight for best reading (or can't read by artificial light), indicates a favorable response to the Neodymium Oxide containing light bulbs. Favorable responses have been elicited from patients with retinitis pigmentosa, optic atrophy, glaucoma with visual field effects, and diabetes with proliferative retinopathy who have undergone panretinal photocoagulation.

A study of low vision patients was conducted by Cohen and Rosenthal at the State University of New York School of Optometry in New York City.[28] Their study also found more accurate color rendering and an improvement in visual acuity, contrast, and a reduction of eye fatigue. Tests were conducted on 51 low vision patients using standard incandescent lamps and standard "A" type Neodymium Oxide lamps on the Vistech 6000 Contrast Test and high and low contrast acuity charts. Results showed a small, but statistically significant performance enhancement when using Neodymium Oxide bulbs. Subjective preference also favored the Neodymium oxide bulbs in a 5 to 1 ratio when a preference was present. The patient population had such pathologies such as achromotopsia, albinism, cataracts, congenital cataracts with aphakia, cortical anoxia, diabetic retinopathy, optic atrophy, pathological myopia, primary nystagmus, retinitis pigmentosa, POP, and SMD.

As a result, it is shown that the use of Neodymium Oxide as a doping agent in the glass of a window will filter out yellow light, thus favoring vision promoting red-green contrast dectectors, to improve visual contrast, visual acuity, and better color recognition.

References

1. David R. Lide, editor; *Handbook of Chemistry and Physics*; 73rd edition; CRC Press; Ann Arbor, Michigan; 1992. p. 4–18, 4–77.
2. Weeks, Mary Elvira; *Discovery of the Elements*; Journal of Chemical Education; 6th Edition; 1960; p. 552.
3. Moeller, Therald; *The Chemistry of the Lanthanides*; Reinhold Publishing Company; New York, New York; 1963; pp. 1–4.
4. Weeks; p. 701.
5. Ibid., p. 704.
6. Ibid., p. 713.
7. Ibid., p. 714.
8. Hufner, S.; "Optical Spectroscopy of Lanthanides in Crystalline Matrix"; in *Systematics and the Properties of the Lanthanides*; edited by Shyama P. Sinha; 1983; p. 313.
9. Ibid., p. 372.
10. Weyl, Woldemar A.; *Coloured Glasses*; Dawson's of Pall Mall; London; 1959; p. 220.
11. Ibid., p. 219.
12. Weidert, F.; "Das Absorptionsspektrum von Didymglasern bei verschiendenartiger Zusammensetzung des Grundglases"; Zeithschrift f. wiss. Photog.; 1921–22; Vol. 21; pp. 254–264.
13. Weyl, Woldemar A., and Evelyn Chostner Marboe; *The Constitution of Glasses*, Vol. 1; Interscience Publishers, a division of John Wiley & Sons; New York, N.Y.; 1962; p. 315.
14. Weyl, Coloured Glasses, p. 77.
15. Ibid., P. 78.
16. Ibid., P. 221.
17. Ibid., P. 221–222.
18. Ibid., P. 226
19. Ibid.
20. Ibid.
21. Bouma, P. J.; The Colour Reproduction of Incandescent Lamps and "Philiphane Glass"; Philips Technical Review; 1938; Vol. 3; pp. 27–29.
22. Ibid.
23. Dannmeyer, F.; "Das Neophanglas als nautisches Hilfsmittel bei unklarer Sicht"; Die Glashutte; 1934; Number 4; pp. 49–50.
24. Ibid.
25. Gouras, P. and E. Zrenner; "Color Vision: A Review from a Neurophysiological Perspective"; in *Progress in Sensory Physiology* 1; Springer-Verlag, Berlin-Heidelberg-New York, 1981.
26. Ibid.
27. Faye, Eleanor; "A New Light Source"; The New York Association for the Blind; New York, N.Y.; undated; one page.
28. Cohen, Jay M. and Bruce P. Rosenthal; "An Evaluation of an Incandescent Neodymium Light Source on Near Point Performance of a Low Light Vision Population"; Journal of Visual Rehabilitation; Vol. 2, No. 4; 1988; pp. 15–21.

SUMMARY OF THE INVENTION

A vast improvement in visual performance, color rendition, and contrast of objects being seen through a window is achieved, for example, by using glass containing Neodymium Oxide in a window glass. There is also a substantial glare reduction as well.

The transmittance of light through glass is governed by the Lambert-Beers Law, which relates the amount of light transmitted through a certain thickness of glass by an absorption coefficient:

Ln (T)=−AL

In the above equation, L is the thickness of the glass, A is the absorption coefficient, T is the percentage of light transmitted, and Ln represents the natural logarithm.

For the purposes of manufacturing Neodymium Oxide containing glasses, the Neodymium Oxide must be reasonably pure. Impurities can reduce the transmittance of light other than yellow, which is absorbed by the Neodymium Oxide in the glass.

The use of Neodymium Oxide as an ingredient in glass making, especially for the production of millions of square feet, if not tens of millions of square feet of window glass per year, requires a substantial amount of Neodymium Oxide of purity of 96.0 to 99.0 percent. The absorption properties of Neodymium Oxide containing glasses were known prior to World War II. However, the cost of producing reasonably pure Neodymium Oxide was quite high, because the chemical properties of the lanthanides are similar, and separation is difficult.

During World War II, while working on the separation of the fission products as part of the atomic bomb project, scientists developed the elution chromagraphic ion exchange method for separating the rare earth elements. A major breakthrough occurred in the 1950's when Frank Spedding and co-workers developed the band-displacement ion exchange method, which was capable of producing macro quantities of extremely pure individual elements. Within 10 years, liquid-liquid extraction methods were developed which provided even lower priced individual rare earth elements.

Thus it is possible to manufacture Neodymium Oxide containing window glass at a reasonable cost, that does not add significantly to the price of new window assemblies. At $20 per Kilogram, the cost of doping glass at 0.0244 grams per square centimeter is $4.88 per square meter of surface area. Complete window assemblies, ready to install in a building, can cost approximately $100 per square meter of surface area.

DESCRIPTION OF THE DRAWINGS

The invention can be best understood with reference to the following drawings in which.

DETAILED DESCRIPTION OF THE DRAWINGS

Figure 1:
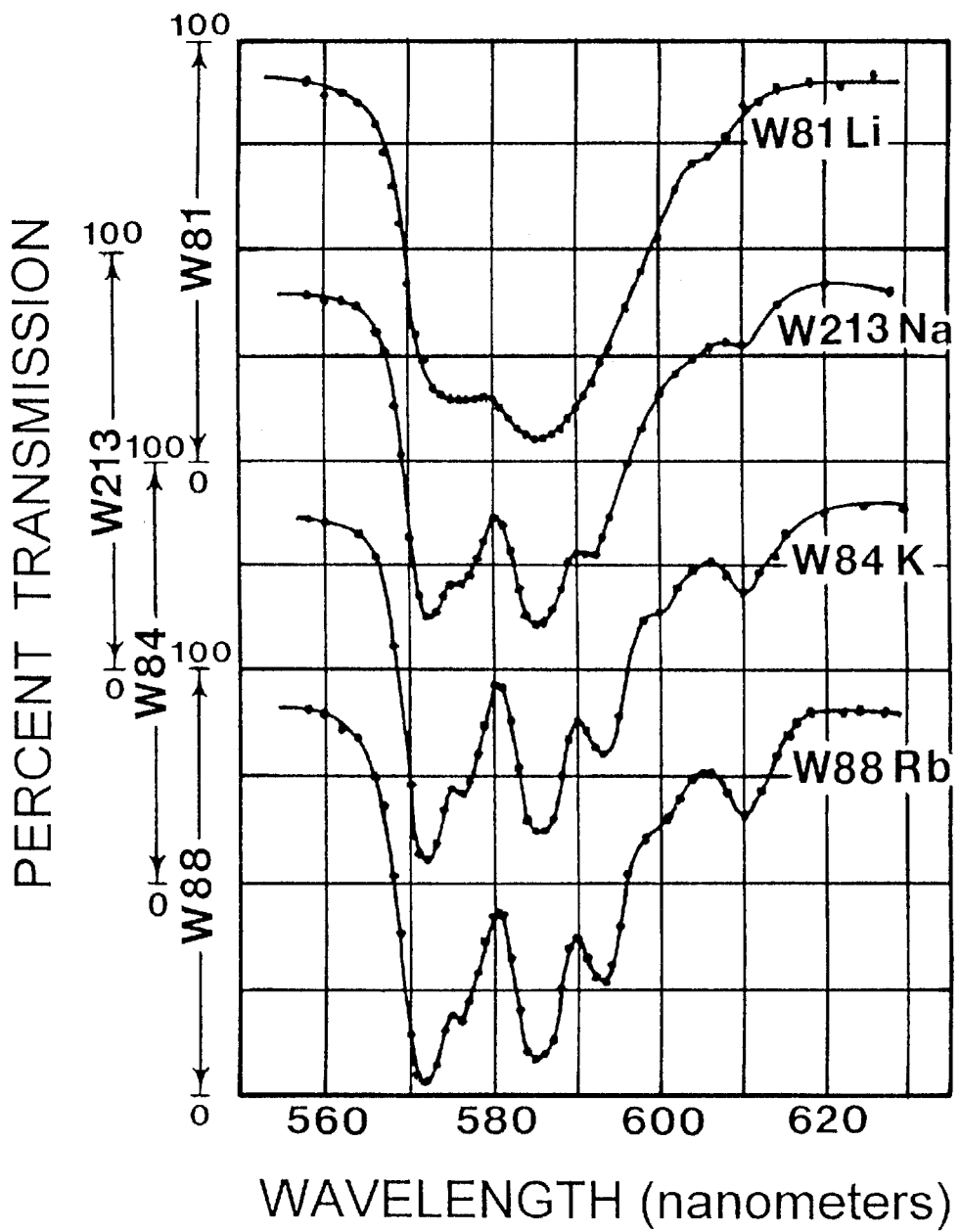
FIG. 1 is a graph comparing the transmittance of a number of Neodymium Oxide containing glasses.

FIG. 1 shows the transmission of light of various glasses containing Neodymium Oxide. It is shown that the smaller the atomic radius of the alkali, the more diffuse is the absorption band. The fine structure of the rubidium glass gradually disappears when this large alkali is replaced by the smaller potassium, sodium, or lithium ion. The importance for the invention at hand is that regardless of the base type of the glass, the absorption of yellow light between 568 and 598 nanometers is seen in all samples of glass. It is seen that the W87 lithium base Neodymium Oxide glass is absorbing 95% of the yellow light at 585 nanometers.

Figure 2:
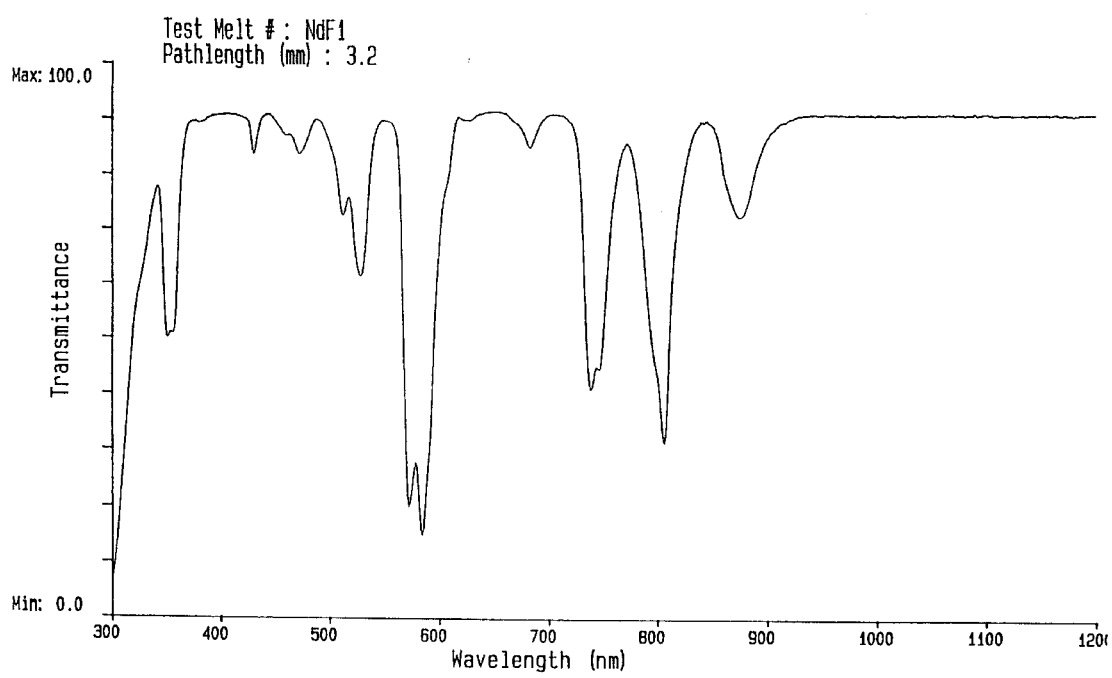
FIG. 2 is a transmittance curve of a piece of Neodymium Oxide doped glass with a total transmittance of 61.81 percent.

FIG. 2 is a light transmittance curve of a piece of Neodymium Oxide glass with a total transmittance of 61.81 percent. This glass is doped at a density of 0.0244 grams per square centimeter of surface area. At 582 nanometers, the light transmittance is 5 percent, filtering out 95 percent of the yellow light.

DETAILED DESCRIPTION OF THE PREFERRED EMBODIMENT

The present invention constitutes a major advance in the production of window glass for glazing that maximizes light transmission while producing a substantial reduction in glare.

As shown in FIG. 2, a piece of glass with a doping level of 0.0244 grams per square centimeter filters out 95 percent of the yellow light at 582 nanometers with a total transmittance of 61.81 percent.

Experimentation has shown that a lower level of Neodymium Oxide doping of the glass, would increase glare to a level to be unacceptable for use as window glass in glazing for architectural use in buildings.

The window glass can be used in single glazed applications, as well as applications requiring multiple layers of glazing material. In the case of multiple glazing, the minimum amount of Neodymium Oxide per square centimeter of the assembled glazing is at least 0.0244 grams per square centimeter of window surface.

As window glass is manufactured in various thicknesses, including various thicknesses for multiple layers of glazing, the doping level is given in terms of a weight per surface area rather than a percent of weight material.

Modifications may be made to the method used for making the device, the device itself as well as the process described for the reduced glare Neodymium Oxide containing window glass without departing from the spirit and scope of the invention as exemplified in the appended claims.

I claim:

1. A window glass for vision purposes which reduces glare, and a means for reducing the amount of transmitted yellow light in the range of 568 to 590 nanometers; said means for reducing the amount of transmitted light comprising said window glass including glass material containing Neodymium Oxide greater than 0.0244 grams per square centimeter based on the total surface area of said window glass.

2. The window glass as in claim 1 wherein said window glass reduces the amount of transmitted yellow light at 582 nanometers by at least 95 percent.

3. Assembled glazing comprising multiple layers of glass wherein the minimum amount of Neodymium Oxide is 0.0244 grams per square centimeter of window area.

4. Assembled glazing comprising multiple layers of glass as in claim 3, wherein said assembled glazing reduces the amount of transmitted yellow light at 582 nanometers by at least 95 percent.

5. A window glass for vision purposes which reduces glare, and a means for reducing the amount of transmitted yellow light in the range of 568 to 590 nanometers; said means for reducing the amount of transmitted light comprising said window glass including glass material containing Neodymium Oxide greater than 0.0244 grams per square centimeter based on the total surface area of said window glass, irrespective of the thickness of said window glass.

6. The window glass as in claim 5, wherein said window glass reduces the amount of transmitted yellow light at 582 nanometers by at least 95 percent.

7. Assembled glazing comprising multiple layers of glass wherein the minimum amount of Neodymium Oxide is 0.0244 grams per square centimeter of window area, irrespective of the combined thickness of said layers of window glass.

8. Assembled glazing comprising multiple layers of glass as in claim 7, wherein said assembled glazing reduces the amount of transmitted yellow light at 582 nanometers by at least 95 percent.

* * * * *